(12) United States Patent
Davydov

(10) Patent No.: US 10,112,634 B1
(45) Date of Patent: Oct. 30, 2018

(54) COLLAPSIBLE SHOPPING CART

(71) Applicant: Angela Davydov, Flushing, NY (US)

(72) Inventor: Angela Davydov, Flushing, NY (US)

(73) Assignee: Angela Davydov, Fresh Meadows, NY (US)

( * ) Notice: Subject to any disclaimer, the term of this patent is extended or adjusted under 35 U.S.C. 154(b) by 0 days.

(21) Appl. No.: 15/427,535

(22) Filed: Feb. 8, 2017

(51) Int. Cl.
*B62B 3/02* (2006.01)
*B62B 3/00* (2006.01)
*B62B 5/00* (2006.01)

(52) U.S. Cl.
CPC ............. *B62B 3/027* (2013.01); *B62B 3/002* (2013.01); *B62B 3/022* (2013.01); *B62B 5/0003* (2013.01)

(58) Field of Classification Search
CPC ......... B62B 3/005; B62B 3/027; B62B 3/002; B62B 3/022; B62B 5/02; B62B 5/002; B62B 5/0003
See application file for complete search history.

(56) References Cited

U.S. PATENT DOCUMENTS

| | | | | |
|---|---|---|---|---|
| 3,082,016 A | * | 3/1963 | Pratt | B62B 5/0003 280/641 |
| 3,118,553 A | | 1/1964 | Rosenzweig | |
| 3,388,920 A | * | 6/1968 | Hill, Sr. | B62B 3/027 280/47.18 |
| 3,948,628 A | * | 4/1976 | McGuire | G21C 3/041 138/109 |
| 5,090,724 A | * | 2/1992 | Fiore | B62B 5/082 280/47.38 |
| 5,328,182 A | * | 7/1994 | Kuo | B62B 5/02 280/47.21 |
| 6,045,150 A | | 4/2000 | Al-Toukhi | |
| 6,070,899 A | * | 6/2000 | Gines | B62B 5/0003 280/43.1 |
| 6,869,097 B2 | * | 3/2005 | Prather | B62B 3/027 280/33.996 |
| 7,080,844 B2 | | 7/2006 | Espejo | |
| D601,772 S | | 10/2009 | de Rueda et al. | |
| 7,997,590 B2 | * | 8/2011 | Walters | B60N 2/2848 248/423 |
| 8,172,256 B2 | | 5/2012 | Fine | |
| 8,408,581 B1 | * | 4/2013 | Hunter | B62B 3/027 280/33.993 |
| 8,733,786 B1 | * | 5/2014 | James | A47C 4/42 280/47.34 |
| 8,764,045 B1 | * | 7/2014 | Kossowsky | B62B 3/005 280/47.18 |

(Continued)

*Primary Examiner* — Hau V Phan

(57) ABSTRACT

A collapsible shopping cart including a collapsible wheeled chassis and a cargo basket mounted thereto. The chassis has a pair of right and left side front and rear beams pivotably attached to a cargo basket floor panel which, in turn, is surrounded with a pair of longitudinal side wall panels, a front wall panel, and a rear panel hingedly attached on a bottom to the floor panel. Each of the front beams extend rearwardly beyond the rear panel and has a distal handle. The rear beams extend forwardly and attach at one end to a rear axle and at the other end to the floor panel. Each longitudinal side wall panel and the floor panel have extension portions extending beyond the rear panel. A maneuvering wheel is disposed on a distal end of the floor panel extension portion floor panel to roll the shopping cart into a vehicle's cargo area.

5 Claims, 4 Drawing Sheets

(56) References Cited

U.S. PATENT DOCUMENTS

Figure 1:
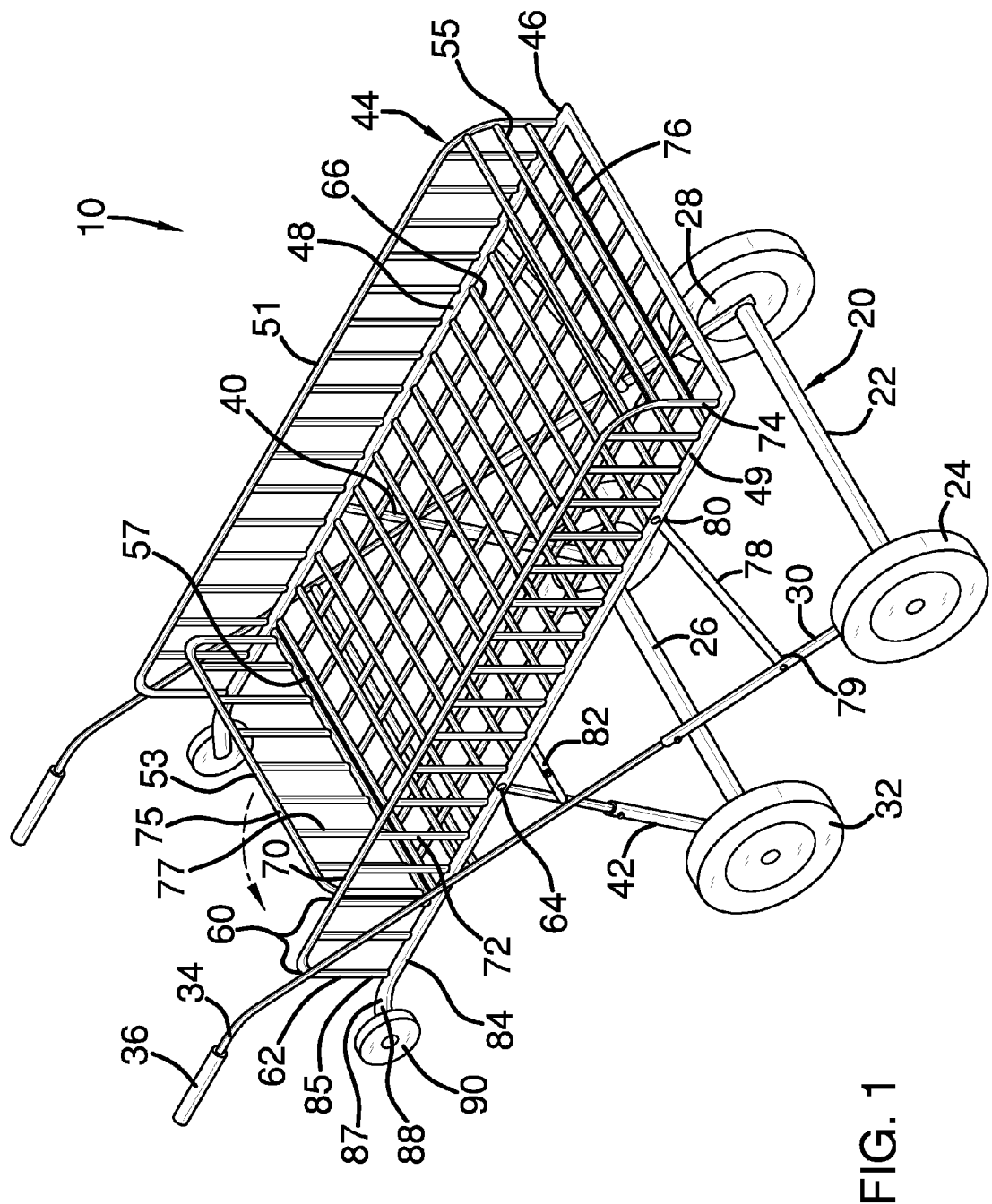

| | | |
|---|---|---|
| D721,464 S | 1/2015 | Darvish |
| 9,126,610 B1 * | 9/2015 | Abiri .................... B62B 5/0003 |
| 2014/0346757 A1 | 11/2014 | Fine |
| 2014/0369801 A1 | 12/2014 | Beauchamp et al. |

* cited by examiner

US 10,112,634 B1

COLLAPSIBLE SHOPPING CART

BACKGROUND OF THE INVENTION

Various types of shopping carts are known in the prior art. Retailers often provide shopping carts, such as a shopping cart with an upper basket rigidly connected to a wheeled lower frame, for use by their customers on the premises to place items for purchase in the shopping car and then to carry the purchased items after checkout to the shopper's vehicle. However, in some instances, retailers do not permit the shopping cart to be removed from the store to the parking lot thus requiring the shopper to hand-carry shopping bags to the vehicle and, in other instances, shoppers are required purchase shopping bags to carry items to the vehicle for transport. What is needed is a collapsible shopping cart in which to place purchased items when both in the store and during transport in the vehicle eliminating the need to employ shopping bags at all or, if shopping bags are used, to carry the shopping bags from the store to the vehicle and directly to the ultimate storage location, such as a home pantry, without ever having to unpack the purchased items during transport from the store to the storage location.

FIELD OF THE INVENTION

The present invention relates to the field of carts, and more particularly, to a collapsible shopping cart.

SUMMARY OF THE INVENTION

The general purpose of the present collapsible shopping cart, described subsequently in greater detail, is to provide a collapsible shopping cart which has many novel features that result in a collapsible shopping cart which is not anticipated, rendered obvious, suggested, or even implied by prior art, either alone or in combination thereof.

To accomplish this, the present collapsible shopping cart includes a chassis. having a front axle and a rear axle, each of which has a pair of front wheels and a pair of rear wheels, respectively, distally disposed thereon. Each of a telescopic right side front beam and a left side front beam extends rearwardly from the front axle and has an outer end with a handle disposed thereon. Each of a telescopic right side rear beam and a left side rear beam extends forwardly from the rear axle. A cargo basket is mounted on the chassis and is configured to store one or more items therein. The cargo basket has a substantially rectangular floor panel that is surrounded by a pair of substantially rectangular longitudinal side wall panels, a transverse rear panel hingedly attached at a bottom edge thereof to the floor panel, and a transverse front wall panel. Each of the longitudinal side wall panels has an extension portion extending from the floor panel rearwardly beyond the rear panel. Each of the right side rear beam and the left side rear beam extends from the rear axle to a respective one of a pair of first pivot pins on the respective right side and left side of the floor panel proximal the front wall panel.

Each of a pair of front support beams, provided to ensure structural integrity of the cargo basket in a balanced level position, has a lower end pivotably disposed on the respective right side front beam and the left side front beam in a position proximal the front axle and an upper end pivotably disposed on a respective right side and left side of the floor panel in a position proximal the front wall panel. A crossbeam connects the right and left side rear beams together in a position proximal the respective one of the pair of first pivot pins to bolster the structural integrity of the cargo basket as well as the entire structure of the shopping cart. Each of pair of extension members of the floor panel is disposed on the extension portion of each of the longitudinal side wall panels and has an outward bend extending rearwardly therefrom and a distal end. Each of the right side front beam and the left side front beam extends from the front axle to a position proximal the rear end of the extension portion of the respective one of the longitudinal side wall panels. A pair of maneuvering wheels, one of which is disposed on the distal end of each extension member, is provided to assist a shopper in maneuvering the chassis and the cargo basket within a vehicle by allowing the shopper to use the handles to push the shopping cart into the cargo area of the vehicle.

Thus has been broadly outlined the more important features of the present collapsible shopping cart so that the detailed description thereof that follows may be better understood and in order that the present contribution to the art may be better appreciated.

BRIEF DESCRIPTION OF THE DRAWINGS FIGURES

Figure 2:
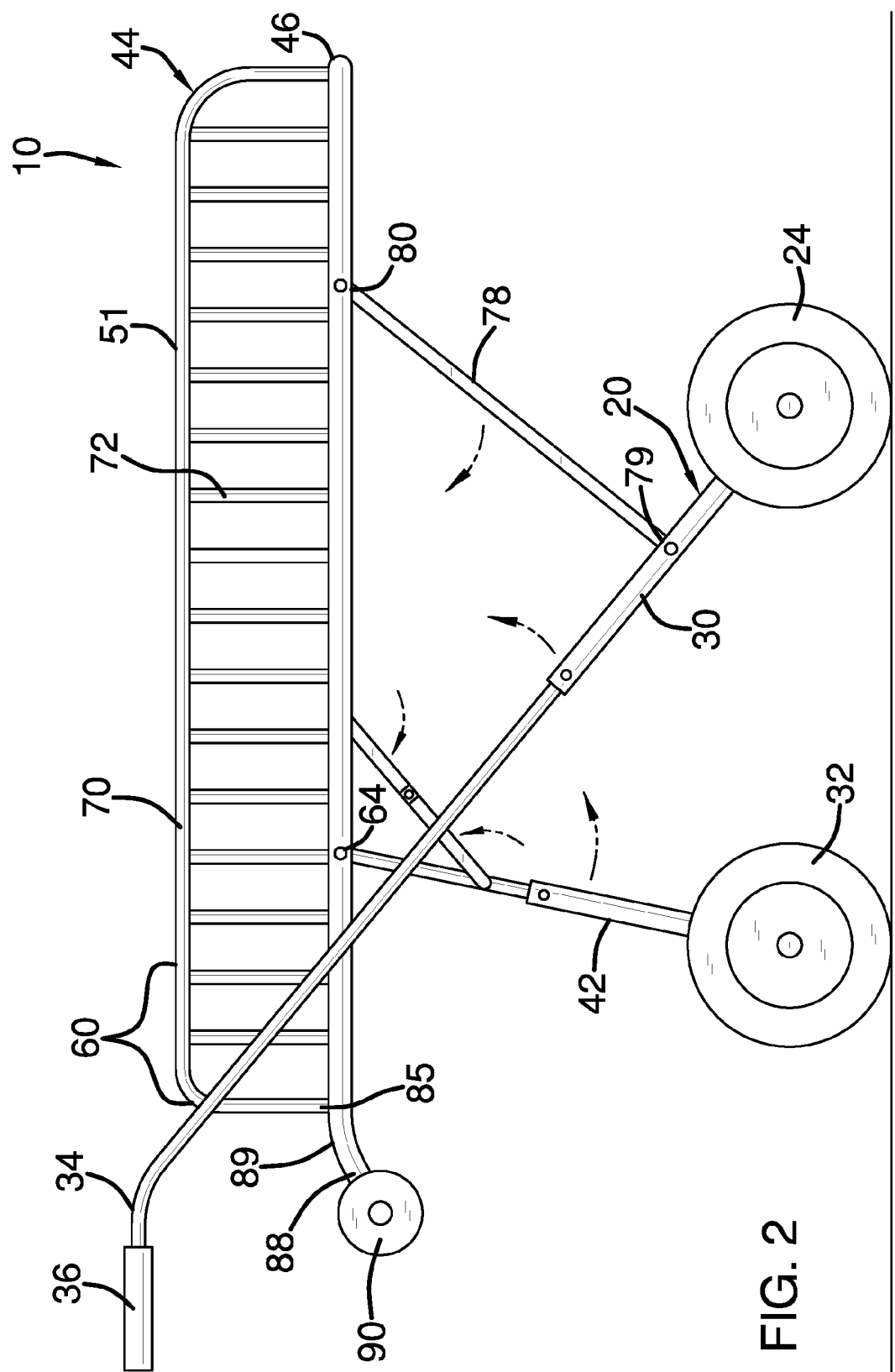
Figure 3:
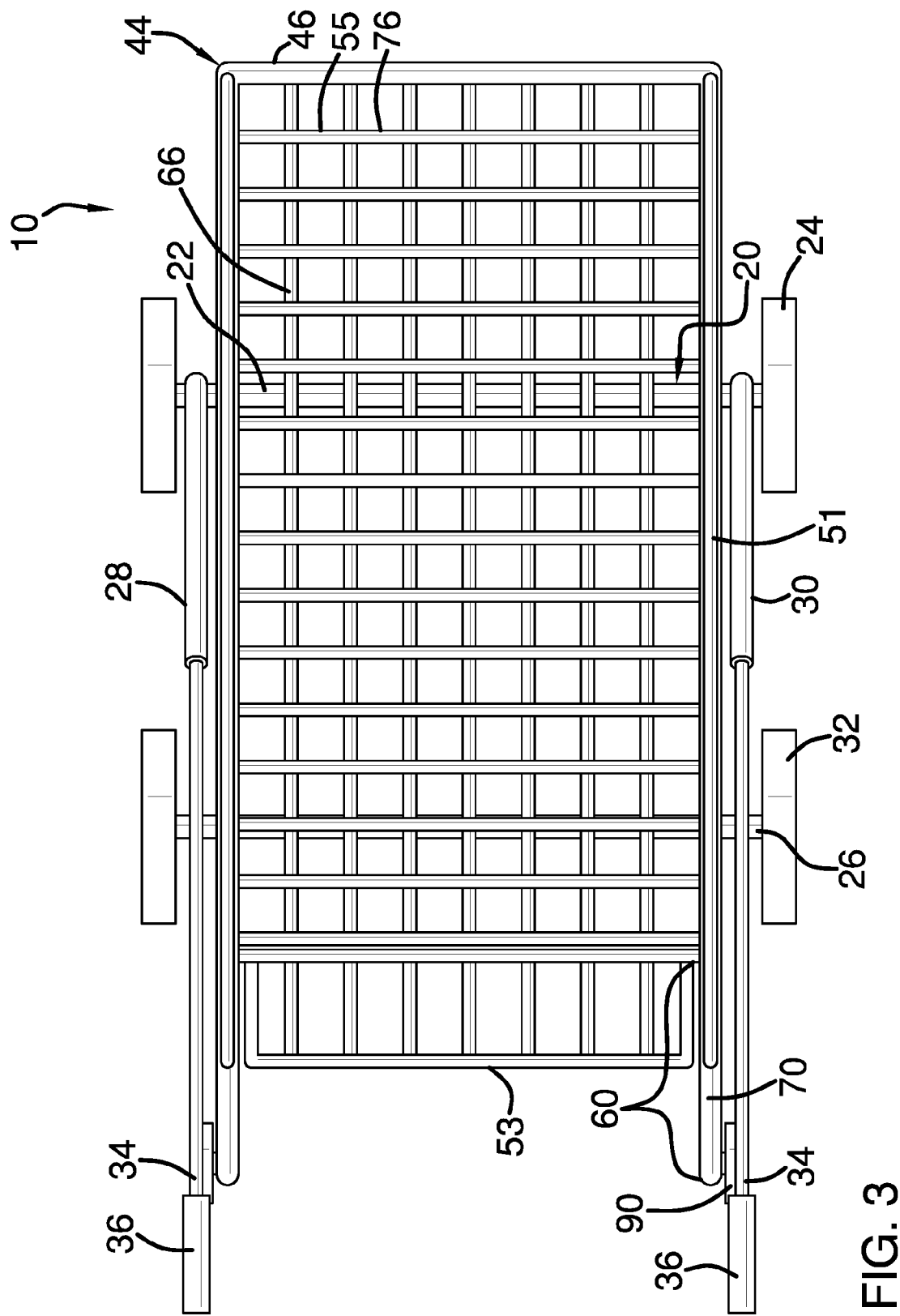
Figure 4:
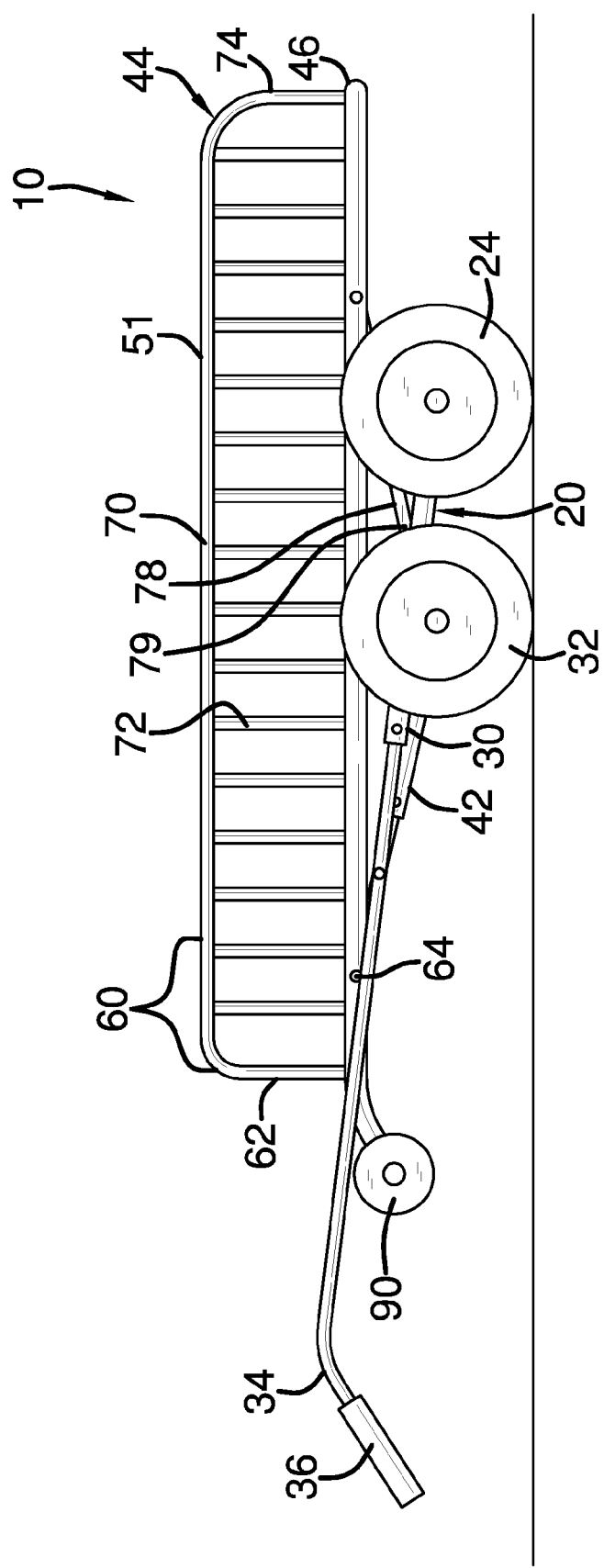

FIG. 1 is an isometric view.
FIG. 2 is a side elevation view in an expanded condition.
FIG. 3 is a top view.
FIG. 4 is a side elevation view in a collapsed condition.

DETAILED DESCRIPTION OF THE DRAWINGS

With reference now to the drawings, and in particular FIGS. 1 through 4 thereof, an example of the instant collapsible shopping cart employing the principles and concepts of the present collapsible shopping cart and generally designated by the reference number 10 will be described.

Referring to FIGS. 1 through 4 the present collapsible shopping cart 10 is illustrated. The collapsible shopping cart 10 includes a chassis 20. The chassis 20 includes a front axle 22 having a pair of front wheels 24 distally disposed thereon, a rear axle 26 parallel to the front axle 22, a telescopic right side front beam 28 extending rearwardly from the front axle 22, and a telescopic left side front beam 30 extending rearwardly from the front axle 22. The rear axle 26 has a pair of rear wheels 32 distally disposed thereon. Each of the right and left side front beams 28, 30 has an outer end 34. A handle 36 is disposed on the outer end 34 of each of the right and left side front beams 28, 30. A telescopic right side rear beam 40 extends forwardly from the rear axle 26 and a telescopic left side rear beam 42 extends forwardly from the rear axle 26.

A cargo basket 44 is mounted on the chassis 20 and is configured to store one or more items therein. The cargo basket 44 has a substantially rectangular floor panel 46 having a right side 48 and a left side 49. The floor panel 46 is surrounded by a pair of substantially rectangular longitudinal side wall panels 51, a transverse rear panel 53, and a transverse front wall panel 55. The rear panel 53 is hingedly attached to the floor panel 46 at a bottom edge 57 of the rear panel 53. The hinged attachment of the rear panel 53 to the floor panel 46 is configured to permit the rear panel 53 to swing downwardly into a position at least coplanar with the floor panel 46, and can also swing in a position out of the way below the floor panel 46. Each of the longitudinal side wall panels 51 has an extension portion 60 extending from the floor panel 46 rearwardly beyond the rear panel 53. The extension portion 60 has a rear end 62. Each of the right side rear beam 40 and the left side rear beam 42 extends from the rear axle 26 to a respective one of a pair of first pivot pins 64 on the respective right side 48 and left side 49 of the floor panel 46 in a position proximal to the front wall panel 55.

The floor panel 46 is formed of a plurality of rigid tubular members 66 arranged in a lattice configuration, which is configured to prevent most small objects, such as grocery items, from falling therethrough. Each of the longitudinal side wall panels 51 and the respective extension portion 60 has a continuous external frame 70 and a plurality of rails 72 longitudinally disposed from a forward end 74 of the respective one of the longitudinal side wall panels 51 to the rear end 62 of the respective extension portion 60. The rear panel 53 also has an exterior frame 75 with a plurality of vertical rail members 77 disposed within the exterior frame 75. The front wall panel 55 has a plurality of bars 76 horizontally disposed between and connecting the longitudinal side wall panels 51.

A pair of front support beams 78 is provided to ensure structural integrity of the cargo basket 44 in a balanced level position. Each of the pair of front support beams 78 has a lower end 79 pivotably disposed on the respective right side front beam 28 and the left side front beam 30 in a position proximal the front axle 22 and an upper end 80 pivotably disposed on the respective right side 48 and left side 49 of the floor panel 46 in a position proximal the front wall panel 55. A crossbeam 82 connects the right side rear beam 40 and the left side rear beam 42 together in a position proximal the respective one of the pair of first pivot pins 64. The crossbeam 82 assists the front support beams 78 in providing structural integrity of the cargo basket 44 as well as the entire structure of the shopping cart 10.

A pair of extension members 84 of the floor panel 46 is disposed on a lower side 85 of the extension portion 62 of each of the longitudinal side wall panels 51. Each of the pair of extension members 84 has an outward bend 87 extending rearwardly therefrom and a distal end 88. Each of the right side front beam 28 and the left side front beam 30 extends from the front axle 22 to a position at least the rear end 62 of the extension portion 60 of the respective one of the longitudinal side wall panels 51. A pair of maneuvering wheels 90 is provided to assist a shopper in maneuvering the chassis 20 and the cargo basket 44 within a vehicle by allowing the shopper to use the handles 36 to push the shopping cart 10 into the cargo area of the vehicle. One of the pair of maneuvering wheels 90 is disposed on the distal end 88 of each of the respective one of the pair of extension members 84.

What is claimed is:

1. A collapsible shopping cart comprising:
a chassis comprising:
a front axle having a pair of front wheels distally disposed thereon;
a rear axle disposed parallel to the front axle, the rear axle having a pair of rear wheels distally disposed thereon;
a telescopic right side front beam extending rearwardly from the front axle;
a telescopic left side front beam extending rearwardly from the front axle, wherein each of the right side front beam and the left side front beam has an outer end;
a handle disposed on the outer end of each of the right side front beam and the left side front beam;
a telescopic right side rear beam extending forwardly from the rear axle;
a telescopic left side rear beam extending forwardly from the rear axle;
a cargo basket mounted on the chassis and being configured to store one or more items therein, the cargo basket having a substantially rectangular floor panel having a right side and a left side, the floor panel surrounded by a pair of substantially rectangular longitudinal side wall panels, a transverse rear panel, and a transverse front wall panel, the rear panel being hingedly attached to the floor panel at a bottom edge of the rear panel, wherein the hinged attachment of the rear panel to the floor panel is configured to permit the rear panel to swing downwardly into a position at least coplanar with the floor panel, each of the longitudinal side wall panels having an extension portion extending from the floor panel rearwardly beyond the rear panel, the extension portion having a rear end, wherein each of the right side rear beam and the left side rear beam extends from the rear axle to one of a pair of first pivot pins on each of the right side and the left side of the floor panel proximal the front wall panel;
a pair of front support beams, each of the pair of front support beams having a lower end pivotably disposed on the right side front beam and the left side front beam in a position proximal the front axle, and an upper end pivotably disposed on the right side and left side of the floor panel in a position proximal the front wall panel;
a crossbeam connecting the right side rear beam and the left side rear beam together in a position proximal the respective one of the pair of first pivot pins;
a pair of extension members of the floor panel disposed on a lower side of the extension portion of each of the longitudinal side wall panels, each of the pair of extension members having an outward bend extending rearwardly therefrom and a distal end, wherein each of the right side front beam and the left side front beam extends from the front axle to a position proximal the rear end of the extension portion of the respective one of the longitudinal side wall panels;
a pair of maneuvering wheels, one of the pair of maneuvering wheels disposed on the distal end of a respective one of the pair of extension members.

2. The collapsible shopping cart of claim 1 wherein the floor panel is formed of a plurality of rigid tubular members arranged in a lattice configuration.

3. The collapsible shopping cart of claim 2 wherein each of the longitudinal side wall panels and the respective extension portion has a continuous external frame and a plurality of rails longitudinally disposed from a forward end of the respective one of the longitudinal side wall panels to the rear end of the respective extension portion.

4. The collapsible shopping cart of claim 2 wherein the rear panel has an exterior frame with a plurality of vertical rail members disposed within the exterior frame and the front wall panel has a plurality of bars horizontally disposed between and connecting the longitudinal side wall panels.

5. A collapsible shopping cart comprising:
a chassis comprising:
a front axle having a pair of front wheels distally disposed thereon;
a rear axle parallel to the front axle, the rear axle having a pair of rear wheels distally disposed thereon;
a telescopic right side front beam extending rearwardly from the front axle;
a telescopic left side front beam extending rearwardly from the front axle, each of the right and left side front beams having an outer end;

a handle disposed on the outer end of each of the right and left side front beams;

a telescopic right side rear beam extending forwardly from the rear axle;

a telescopic left side rear beam extending forwardly from the rear axle;

a cargo basket mounted on the chassis and being configured to store one or more items therein, the cargo basket having a substantially rectangular floor panel having a right side and a left side, the floor panel surrounded by a pair of substantially rectangular longitudinal side wall panels, a transverse rear panel, and a transverse front wall panel, the rear panel being hingedly attached to the floor panel at a bottom edge of the rear panel, wherein the hinged attachment of the rear panel to the floor panel is configured to permit the rear panel to swing downwardly into a position at least coplanar with the floor panel, each of the longitudinal side wall panels having an extension portion extending from the floor panel rearwardly beyond the rear panel, the extension portion having a rear end, wherein each of the right side rear beam and the left side rear beam extends from the rear axle to a respective one of a pair of first pivot pins on the respective right side and left side of the floor panel proximal the front wall panel;

a pair of front support beams, each front support beam a lower end pivotably disposed on the right side front beam and the left side front beam in a position proximal the front axle and an upper end pivotably disposed on the right side and the left side of the floor panel in a position proximal the front wall panel;

a crossbeam connecting the right side rear beam and the left side rear beam together in a position proximal the respective one of the pair of first pivot pins;

a pair of extension members of the floor panel disposed on a lower side of the extension portion of each of the longitudinal side wall panels, each of the pair of extension members having an outward bend extending rearwardly therefrom and a distal end, wherein each of the right side front beam and the left side front beam extends from the front axle to a position at least the rear end of the extension portion of the respective one of the longitudinal side wall panels;

a pair of maneuvering wheels, one of the pair of maneuvering wheels disposed on the distal end of a respective one of the pair of extension members;

wherein the floor panel is formed of a plurality of rigid tubular members arranged in a lattice configuration;

wherein each of the longitudinal side wall panels and the respective extension portion has a continuous external frame and a plurality of rails longitudinally disposed from a forward end of the respective one of the longitudinal side wall panels to the rear end of the respective extension portion; and wherein the rear panel has an exterior frame with a plurality of vertical rail members disposed within the exterior frame and the front wall panel has a plurality of bars horizontally disposed between and connecting the longitudinal side wall panels.

\* \* \* \* \*